(12) United States Patent
El-Antably et al.

(10) Patent No.: US 7,643,733 B2
(45) Date of Patent: Jan. 5, 2010

(54) CONTROL DEVICE FOR DRIVING A BRUSHLESS DC MOTOR

(75) Inventors: Ahmed M. El-Antably, Indianapolis, IN (US); Asma B. Rhouma, Ksour Essef (TN); Ahmed Masmoudi, Sfax (TN); Alan G. Holmes, Clarkston, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 335 days.

(21) Appl. No.: 11/829,216

(22) Filed: Jul. 27, 2007

(65) Prior Publication Data

US 2009/0028532 A1    Jan. 29, 2009

(51) Int. Cl.
*H02P 7/285*    (2006.01)
*H02P 7/42*    (2006.01)

(52) U.S. Cl. .................. 388/820; 388/812; 318/700; 318/722

(58) Field of Classification Search ............... 388/805, 388/821, 813, 820; 318/700, 705, 722, 723
See application file for complete search history.

(56) References Cited

U.S. PATENT DOCUMENTS

| | | | | |
|---|---|---|---|---|
| 5,270,634 A | * | 12/1993 | Auinger | 318/815 |
| 5,796,233 A | * | 8/1998 | Satake et al. | 318/705 |
| 5,945,797 A | * | 8/1999 | Johnson | 318/490 |
| 6,038,114 A | * | 3/2000 | Johnson | 361/23 |
| 6,072,674 A | * | 6/2000 | Johnson | 361/23 |
| 6,169,383 B1 | * | 1/2001 | Johnson | 318/771 |
| 6,184,795 B1 | * | 2/2001 | Johnson | 340/648 |
| 6,304,053 B1 | * | 10/2001 | Johnson | 318/771 |
| 6,426,603 B1 | * | 7/2002 | Johnson | 318/434 |
| 6,498,736 B1 | * | 12/2002 | Kamath | 363/44 |
| 7,057,371 B2 | * | 6/2006 | Welchko et al. | 318/400.27 |
| 2002/0186112 A1 | * | 12/2002 | Kamath | 336/5 |
| 2005/0231152 A1 | * | 10/2005 | Welchko et al. | 318/801 |
| 2008/0278102 A1 | * | 11/2008 | Taniguchi | 318/400.27 |

* cited by examiner

*Primary Examiner*—Paul Ip

(57) ABSTRACT

A delta type inverter is used in conjunction with a closed-loop motor controller to provide a control device for driving a three phase brushless direct current motor. The delta inverter has one-half of the solid state switching devices and diodes required by conventional bridge type inventers, thereby improved reliability, and enabling the motor control device to have reduced size, cost and weight. The closed-loop motor controller may include a torque loop for reducing torque ripple during operation of the motor.

20 Claims, 4 Drawing Sheets

CONTROL DEVICE FOR DRIVING A BRUSHLESS DC MOTOR

TECHNICAL FIELD

The present invention is related to the control of brushless DC motors, and more particularly to a control device for driving a three phase brushless DC motor using a delta inverter to energize the motor stator windings.

BACKGROUND OF THE INVENTION

Recently, brushless direct current motors (BDCMs) have been the subject of much work and discussion. The stator windings of these motors are sequentially energized at appropriate times to produce a rotating magnetic field, which in turn causes rotation of the motor's permanent magnetic rotor.

Control devices for BDCMs have conventionally used full-wave bridge inverters having six solid state switching devices and six diodes to appropriately switch a single DC source of power to provide three-phase energization of the stator windings of BDCMs (see for example, U.S. Pat. No. 4,544,868 issued Oct. 1, 1985 to Murty, and assigned to the same assignee as the present application).

When BDCMs are used as a means for propulsion in electric or hybrid vehicles, the capacity of the motors and inverters must be substantial due to the large power requirements. In such applications, the inverters can represent a significant portion of the cost, mass, and packaging size of the motor propulsion systems. In addition, the reliability of control devices using such inverters is inversely related to the required number of solid state switching devices and diodes in the inverter.

Accordingly, it would be advantageous if fewer solid state switching devices and diodes could be employed in the fabrication of power inverters in control devices used for driving BDCMs.

SUMMARY OF THE INVENTION

The Applicants have found that a three phase BDCM can be effectively driven by a control device utilizing a delta type inverter that employs only one-half the solid state switching devices and diodes required in conventional full-wave bridge type inverters.

In accordance with an embodiment, the delta inverter is coupled to the BDCM having a permanent magnet rotor and three stator windings. The delta inverter includes three direct current voltage sources made up of three substantially equal and separated parts of a battery pack, and three associated solid state switching devices. The direct current voltage sources are selectively applied to different pairs of the motor stator windings by timed application of gate signals to switch the solid state switching devices to conducting states. This produces phase currents in each of the respective stator windings, which establishes a rotating magnetic field causing rotation of the permanent magnet rotor.

The delta inverter is used in conjunction with a closed-loop motor controller to provide the control device for the BDCM. The closed-loop motor controller receives a motor command signal indicative of a desired operation condition for the BDCM, and a plurality of motor operating signals indicative of measured motor operation. The closed-loop motor controller is adapted to generate the appropriate gate signals based upon the motor command signal and the motor operating signals to control the phase currents produced in the stator windings so the BDCM operates at a desired operating condition.

According to one embodiment, the delta inverter may include three diodes, with each diode being connected in anti-parallel across different ones of the solid state switching devices to enable phase currents from the motor to charge the direct current voltage sources when gate signals are not being applied to switch the solid state switching devices to conducting states.

According to another embodiment, appropriate control of the BDCM can be achieved by modulating different portion of each gate signal with different pulse width modulation signals, where the different pulse width modulation signals have different duty cycles determined based upon the motor command signal and different ones of the motor operating signals.

According to a further embodiment, the closed-loop controller includes a phase current waveform generator for generating reference phase current signals used in controlling the phase currents to approximate quasi-square waveforms comprising positive and negative amplitude square shaped pulses for each electrical cycle of rotation of the permanent magnet rotor.

According to yet another embodiment, the closed-loop motor controller includes a hysteresis controller for producing different pulse width modulation signals having duty cycles determined based upon differences between the reference phase current signals and the measured phase current signals provided by current sensors coupled to the motor stator windings.

According to yet a further embodiment, the closed-loop motor controller includes a torque loop utilizing a torque estimator that estimates the torque being produced by BDCM based upon the measured phase current signals and trapezoidal waveforms representative of back EMF voltages generated in the motor stator winding by rotation of the permanent magnet rotor.

Accordingly, the invention enables the effective control of a brushless direct current motor using a delta inverter having only one-half the solid state switching devices and diodes required in conventional inverters, thereby significantly reducing the size, cost, and weight of motor control devices, while increasing reliability.

BRIEF DESCRIPTION OF THE DRAWINGS

The present invention will now be described in the following detailed description with reference to the accompanying drawings, in which like reference characters designate the same or similar elements throughout the drawings, wherein.

DESCRIPTION OF THE PREFERRED EMBODIMENT

Figure 1:
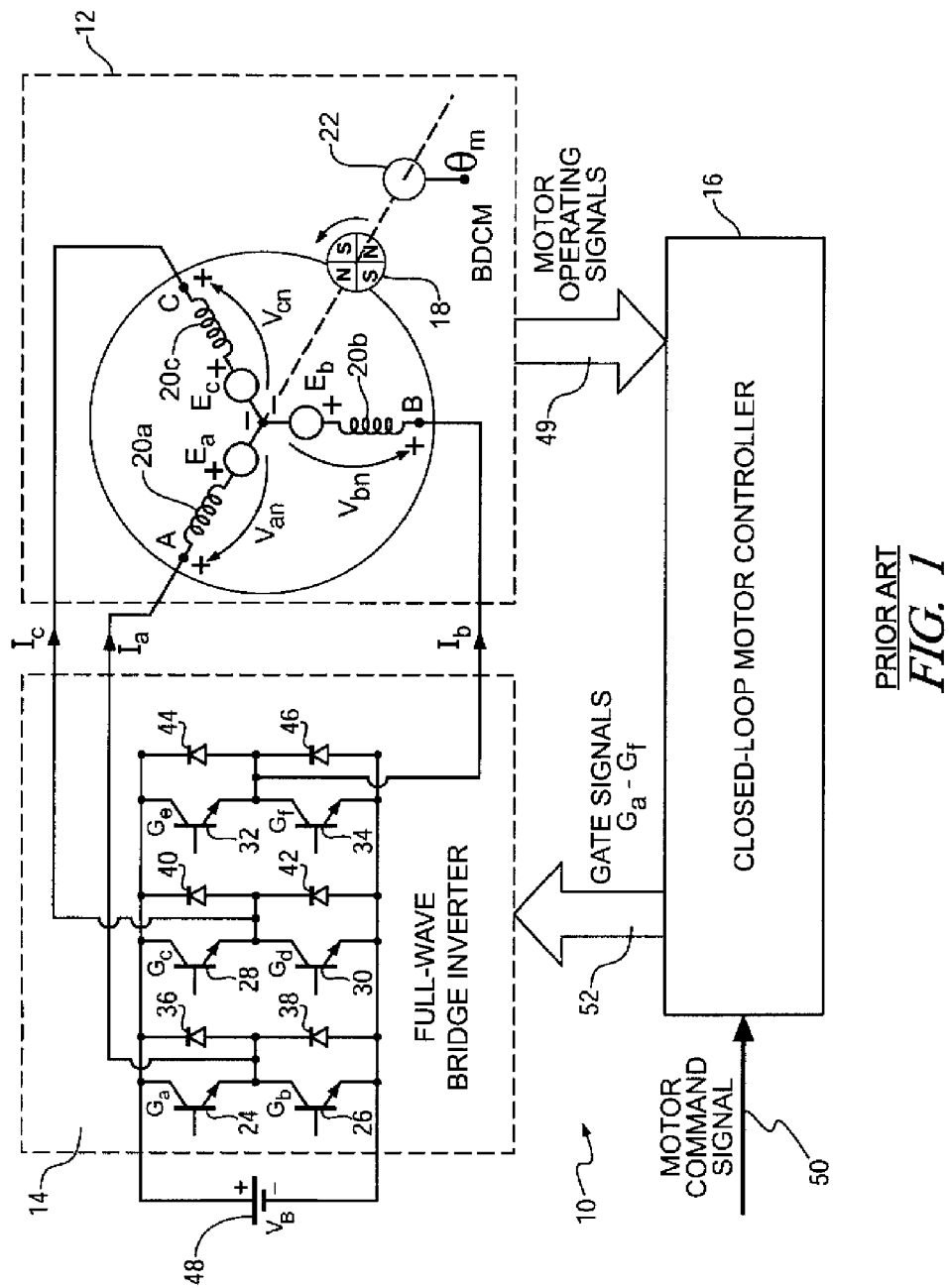
FIG. 1 is a schematic diagram of a conventional BDCM control device employing a full-wave bridge inverter.

Referring now to FIG. 1, reference numeral 10 generally designates a conventional control device for driving a BDCM 12. This control device includes a full-wave bridge inverter 14, and a closed-loop motor controller 16.

BDCM 12 is shown as a three phase motor having a permanent magnet rotor 18, and three stator windings 20a, 20b, and 20c connected in a wye-configuration between motor terminals A, B, and C. Although not necessary for all applications, BDCM 12 is also shown equipped with a rotor position sensor 22, which provides an output rotor position signal $\theta_m$ representing the mechanical rotational angular position of rotor 18 relative to the stator windings 20a-20c. Position sensor 22 can be a Hall Effect sensor, or any other type position encoder known in the art. Those skilled in the art will recognize that other techniques exist for determining the angular position of rotor 18, without the use of a rotor position sensor 22 (see for example, U.S. Pat. No. 5,949,204 issued to Huggett et al.)

The BDCM 12 is shown as having phase currents $I_a$, $I_b$, and $I_c$ flowing through respective stator windings 20a, 20b, and 20c. The phase to neutral voltages across each of the stator winding 20a-20c are respectively designated as $V_{an}$, $V_{bn}$, $V_{cn}$, with the back EMF voltages generated in each of the stator windings 20a-20c respectively shown as the voltages $E_a$, $E_b$, and $E_c$ produced by ideal voltage sources each respectively shown connected in series with stator windings 20a-20c. As is well known, these back EMF voltages $E_a$, $E_b$, and $E_c$ are the voltages induced in the respective stator windings 20a-20c by the rotation of permanent magnet rotor 18.

Figure 2:
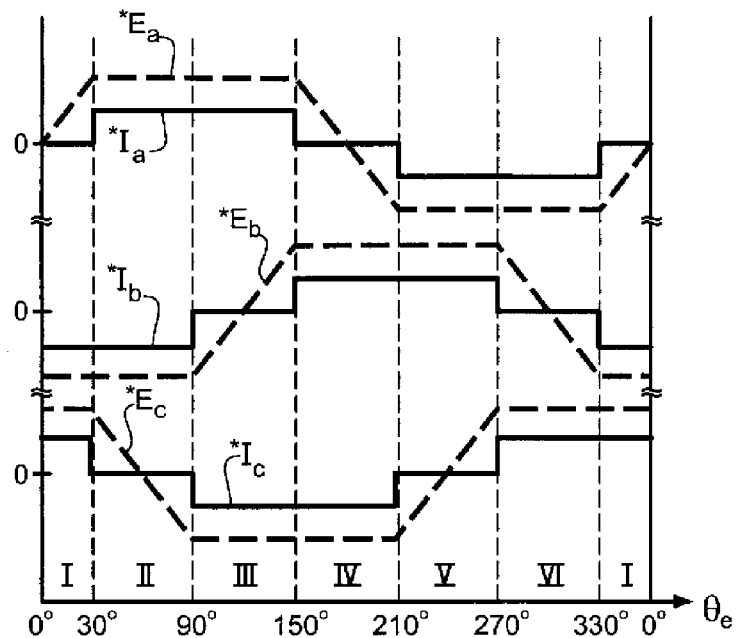
FIG. 2 shows a graphical representation of the idealized waveforms for the phase currents and the corresponding back EMF phase voltages in the stator winding of a three-phase BDCM under ideal operating conditions.

FIG. 2 illustrates the ideal or desired waveforms, designated respectively as $*I_a$, $*I_b$, and $*I_c$, for the actual phase currents $I_a$, $I_b$, and $I_c$ flowing into stator windings 20a-20c to achieve effective operation of BDCM 12. These waveforms are commonly referred to in the art as quasi-square waveforms when plotted as a function of $\theta_e$, which represents the electrical angular position of rotor 18 relative to the stator windings 20a-20c. For each complete cycle of electrical rotation of rotor 18 (i.e., a 360° change in $\theta_e$), each of these quasi-square waveforms comprises a positive and a negative amplitude square shaped pulse, with each square shaped pulse existing for approximately 120° of electrical rotation (width of the pulse). In each waveform the consecutive positive and negative pulses are separated by zero amplitude portions of the waveform existing for approximately 60° of electrical rotation. Each of the quasi-square waveforms represents a different phase current, and is shifted by approximately 120° of electrical rotation with respect to the other quasi-square waveforms, thereby providing three-phase current excitation for BDCM 12. It will be understood that the angular relationship between the mechanical and electrical rotational positions is given by the following known equation:

$$\theta_m = (2/P)\theta_e, \quad (1)$$

where P is an integer representing the number of physical poles of BCDM 12.

FIG. 2 also illustrates ideal waveforms for back EMF phase voltages $*E_a$, $*E_b$, and $*E_c$ that would be generated by the respective voltage sources labeled as $E_a$, $E_b$, and $E_c$ in each of the stator windings 20a-20c, when BDCM 12 is driven with the idealized phase currents $*I_a$, $*I_b$, and $*I_c$. These idealized back EMF phase voltages are commonly referred to in the art as ideal trapezoidal back EMF waveforms when plotted as a function of $\theta_e$. Each of the idealized trapezoidal back EMF phase voltages $*E_a$, $*E_b$, and $*E_c$ can be expressed as:

$$*E_a = K_e \cdot \omega_m \cdot f_a(\theta_e), \quad (2)$$

$$*E_b = K_e \cdot \omega_m \cdot f_b(\theta_e), \quad (3)$$

$$\text{and } *E_c = K_e \cdot \omega_m \cdot f_c(\theta_e), \quad (4)$$

where $K_e$ is the back EMF constant of BDCM 12, and $\omega_m$ represents the actual motor operating speed, i.e., the mechanical angular rotational speed of rotor 18, which is equal to the time rate of change of $\theta_m$, or:

$$\omega_m = (d/dt)\theta_m. \quad (5)$$

The functions $f_a(\theta_e)$, $f_b(\theta_e)$, and $f_c(\theta_e)$ in Equations (2), (3), and (4) above are normalized idealized trapezoidal waveforms varying as a function of $\theta_e$ as shown in FIG. 2, with defined maximum and minimum amplitudes of +1 and −1, respectively.

It will be understood that the above described quasi-square waveforms for the ideal phase currents $*I_a$, $*I_b$, and $*I_c$, and the trapezoidal waveforms for the ideal back EMF phase voltages $*E_a$, $*E_b$, and $*E_c$ are predetermined functions dependent upon the electrical angular position $\theta_e$ of BDCM 12. Consequently, these waveforms can be easily generated by computation or from look-up tables based upon the electrical angular position $\theta_e$ of rotor 18 as it rotates through each cycle of electrical rotation.

In operation, the actual phase currents $I_a$, $I_b$, and $I_c$ flow through the stator windings 20a-20c to establish a rotating magnetic field, which produces torque with respect to permanent magnet rotor 18 causing it to rotate. The amplitudes of these phase currents determine the amount of torque produced, and can be used to control the motor rotational speed. Increasing the amplitudes of the actual phase currents driving BDCM 12, results in greater torque and greater motor operating speed $\omega_m$.

Those skilled in the art will also recognize that the timing of the actual phase currents $I_a$, $I_b$, and $I_c$ are typically adjusted with regard to the electrical angular position $\theta_e$ of permanent magnet rotor 18 so the rotating axis of the magnetic field produced by stator windings 20a-20c leads the magnetic field axis of the rotor 18. Adjustment of this lead angle can be used to increase the torque developed by rotor 18 for fixed amplitudes of the phase currents driving BDCM 12. As known in the art, this lead angle can be a predetermined fixed value, or a variable value determined based upon the operating conditions of BDCM 12, such as the motor operating speed $\omega_m$. In what follows, it will assumed that the above lead angle has been adjusted as appropriate for the control of BDCM 12, without further discussing this aspect of motor operation.

Referring again to FIG. 1, inverter 14 is shown as having six solid state switching devices 24, 26, 28, 30, 32, and 34 connected in a bridge configuration. For the purpose of illustration, the solid state switching devices are shown as power transistors; but they could also be realized by using MOSFETs or IGBTs (Insulated Gate type Bipolar Transistors). Series connected pairs of the solid state switching devices are attached in parallel across battery 48, which has a terminal voltage $V_B$. Diodes 36, 38, 40, 42, 44, and 46 are each connected across a different emitter-collector junction of the solid state switching devices 24-34 to conduct current in a direction opposite that of the solid state switching devices 24-34 when such devices are switched off. The stator windings 20a-20c of BDCM 12 are coupled to the inverter 14 by connecting each winding between different pairs of the series connected power transistors 24-34.

Using known techniques, closed-loop motor controller 16 operates in a closed-loop fashion by receiving motor operating signals 49 from BDCM 12 along with motor command signal 50 to generate gate signals 52 (individually designated as $G_a$-$G_f$) for switching solid state switching devices 24-34 so that BDCM 12 operates in accordance with the motor command signal 50. Typically, closed-loop motor controller 16 is implemented as a programmed microprocessor with the appropriate analog-to-digital converters and other circuitry, or as a programmed digital signal processor (DSP), but other known discrete analog/digital circuitry could also be used. Known control strategies, algorithms, and processes for controlling BDCM 12 can be easily programmed into microprocessors or DSPs, which can simplify the amount of discrete circuitry required in the implementation of the motor controller 16. The programmed microprocessor or DSP then executes steps in the method or process of controlling the BDCM 12.

The motor command signal 50 can take the form of a commanded motor speed or motor torque signal representing the desired or commanded operation of BDCM 12. The motor operating signals 49 are obtained by measuring operating characteristics of BDCM 12, as for example, the motor rotational position $\theta_m$ provided by position sensor 22, signals representing the magnitude of some or all of the actual phase currents $I_a$, $I_b$, and $I_c$, the total current being supplied by battery 48 to the BDCM 12, the phase-to-phase voltages between motor terminals A, B, and C, and/or other measured signals useful in implementing known control strategies in closed-loop motor controller 16.

Control device 10 is operated to drive BDCM 12 by selectively activating solid state switching devices 24-34 by the application of gate signals $G_a$-$G_f$ to the base terminals of the associated solid state switching devices 24-34. In FIG. 1, the gate signals $G_a$-$G_f$ are shown slightly above and to the left of each of the respective solid state switching devices 24-34. The solid state switching devices 24-34 are selectively activated to sequentially apply or connect the terminal voltage $V_B$ of battery 48 across different pairs of wye-connected stator windings 20a-20c. By selecting the appropriate form and timing of each of the gate signals $G_a$-$G_f$, the actual phase currents $I_a$, $I_b$, and $I_c$ driving BDCM 12 can be controlled to take the form of (i.e., approximate) the idealized quasi-square waveforms shown in FIG. 2.

In FIG. 2, each complete cycle of electrical rotation of the rotor electrical angular position $\theta_e$ is divided into six commutation sequences I-VI, where each represents a different switching sequence for the power transistors 24-34. For example, one possible control strategy involves turning on power transistors 28 and 34 by gate signals $G_c$ and $G_f$ as rotor 18 rotates through sequence I ($\theta_e$=330° to $\theta_e$=30°). As a result, the terminal voltage $V_B$ of battery 48 will be applied across motor terminals C and B connected to the pair of stator windings 20c and 20b, which causes phase current $I_c$ to flow from the positive terminal of battery 48 into stator winding 20c, through stator winding 20b, and back to the negative terminal of battery 48. It will be understood that in this case, $I_a$=0 and $I_b$=−$I_c$ with $I_c$>0 as required for idealized operation, since $I_a$+$I_b$+$I_c$=0 for the wye-connected configuration of the stator windings 20a-20c. Likewise for sequences II, III, IV, V, and VI shown in FIG. 2, the following respective pairs of solid state switching devices would be gated on to conduct current: (24 and 34), (24 and 30), (32 and 30), (32 and 26), and (28 and 26), which forces the actual phase currents $I_a$, $I_b$, and $I_c$ for BDCM 12 to have the idealized quasi-square waveforms of FIG. 2.

Conventionally, in controlling BDCM 12 to operate in accordance with a motor command signal 12, it is necessary to pulse width modulate (PWM) the gate signals $G_a$-$G_f$. Using known techniques, the closed-loop motor controller 16 typically compares the motor command signal 50 with a signal based upon one or more of the motor operating signals 49 to generate a current control signal, which determines the duty cycle of the pulse width modulation signal applied to modulate the gate signals $G_a$-$G_f$. The larger the duty cycle, the larger the average voltage applied to the stator windings 20a-20c, and consequently, the larger the amplitudes of the actual phase currents $I_a$, $I_b$, and $I_c$ driving BDCM 12.

Those skilled in the art will recognize that the pulse width modulation of the gate signals, as described above, for the full-wave bridge inverter 14 is simplified due to the fact that for each switching sequences I-VI, the same terminal voltage $V_B$ of the battery 48 is sequentially applied across different pairs of stator windings 20a-20c. As a result, all of the gate signals $G_a$-$G_f$ can be pulse width modulated based upon a single control signal. One way this is typically accomplished is by comparing the motor command signal 50 with a signal which represents the corresponding actual measured operation of BDCM 12 to generate an error signal. The generated error signal is related to a reference current value representing the total current required to be supplied to BDCM 12 to achieve the commanded motor operation. The control signal used for determining the duty cycle of the pulse width modulation signal applied to the gate signals $G_a$-$G_f$ is determined based upon the difference between the generated reference current value and the actual measured total current being supplied by battery 48 to drive BDCM 12 (see for example the description in U.S. Pat. No. 4,544,868 assigned to the same assignee of the present invention).

It will also be understood by those skilled in the art that inverter 14 also provides for regeneration or charging of battery 48 by BDCM 12, when gate signals $G_a$-$G_f$ are not used to turn on solid state switching devices 24-34. For example during sequence I, if solid state switching devices 28 and 34 are not turned on (i.e., not in the conducting state), diodes 42 and 44 will conduct current back to charge battery 48 due to the back EMF voltages $E_b$ and $E_c$ generated by the rotation of permanent magnet rotor 18 in relation to stator windings 20b and 20c, and likewise for the other diodes and associated stator windings.

As indicated previously, when BDCMs are used to provide propulsion in electric or hybrid vehicles, the capacity of the motors and inverters must be substantial due to the large power requirements. In such applications, the inverters can represent a substantial portion of the cost, mass, and packaging size of the motor propulsion systems. It is also known that the reliability of control devices using such inverters is inversely related to the required number of solid state switching devices and diodes required by the inverter. As a result, it would be advantageous if fewer solid state switching devices and diodes could be employed in the fabrication of power inverters for control devices used in driving BDCMs.

The Applicants have found that efficient control of a BDCM 12 can be achieved by utilizing a closed-loop motor controller in conjunction with a delta type inverter, which employs only one-half the solid state switching devices and diodes required in a conventional full-wave bridge type inverter. Accordingly the size, cost, and weight of BDCM control devices can be significantly reduced, while increasing reliability.

Delta type inverters have been considered in the past as means for providing three phase sinusoidal excitation for induction type motors; see for example, GB Patent. No.

1,543,581 issued to Eastham, and the publication entitled "Delta Inverter," authored by P. D. Evans, R. C. Dodson, and J. F. Eastham, Proc. TEE, vol. 127, Pt. B, November 1980, pp. 333-340. However, the Applicants are not aware of any disclosed applications where delta type inverters have been used to energize and control the operation of BDCMs in a closed-loop fashion.

Figure 3:
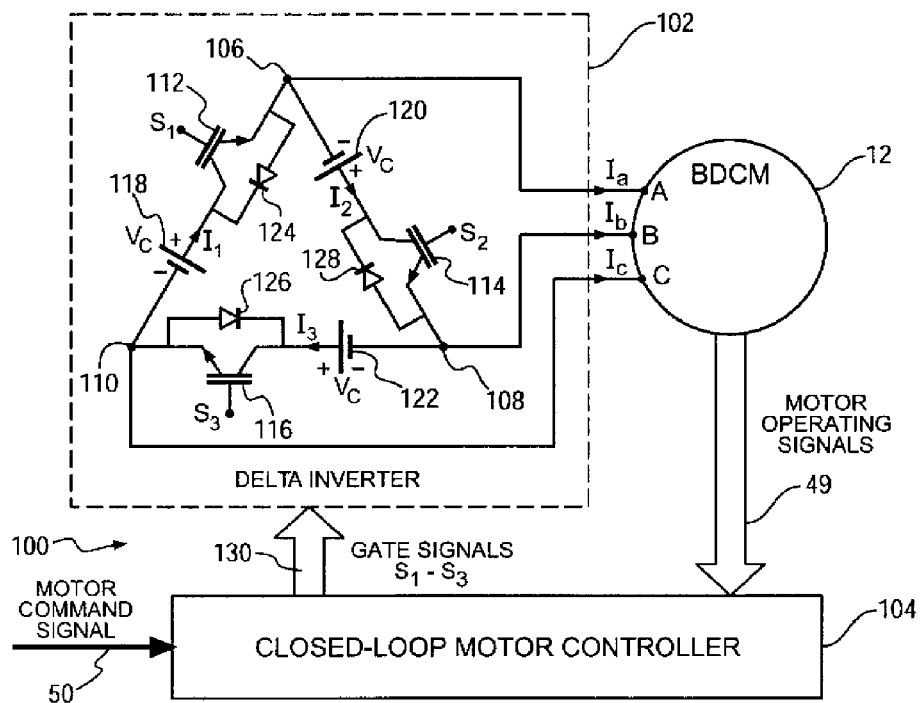
FIG. 3 is a schematic diagram for a BDCM control device that operates in accordance with the principles of the present invention utilizing a delta type inverter.

Referring now to FIG. 3, reference numeral 100 generally designates a control device for driving BDCM 12 in accordance with the principles of the present invention. Control device 100 includes a delta inverter 102, and a closed-loop motor controller 104 that can be implemented using hardware similar to that previously described with regard to the conventional closed-loop motor controller 16.

Closed-loop motor controller 104 receives motor operating signals 49 and motor command signal 50, just as does conventional closed-loop motor controller 16; however, only three gate signals $S_1$-$S_3$ are required for operating the delta inverter 102, rather that the six gate signals $G_a$-$G_f$ needed when operating full-wave bridge inverter 14.

Inverter 102 has a first inverter terminal 106, a second inverter terminal 108, and a third inverter terminal 110, each of which is respectively coupled to a different one of the motor terminals A-C of BDCM 12. The inverter 102 includes three solid state switching devices 112-116, shown in this embodiment as IBGTs, and three direct current voltage sources 118-122, each having a terminal voltage of $V_c$. Solid state switching device 112 and direct current voltage source 118 are connected in series between inverter terminals 106 and 110 so that current $I_1$ is conducted in a direction toward inverter terminal 106 when solid state switching device 112 is switched to an on or conducting state by gate signal $S_1$. Likewise, solid state switching device 114 and direct current voltage source 120 are connected in series between inverter terminals 106 and 108 so that current $I_2$ is conducted in a direction toward inverter terminal 108 when solid state switching device 114 is switched to an on or conducting state by gate signal $S_2$, and solid state switching device 116 and direct current voltage source 122 are connected in series between inverter terminals 108 and 110 so that current $I_3$ is conducted in a direction toward inverter terminal 110 when solid state switching device 116 is switched to an on or conducting state by gate signal $S_3$.

Although not required for driving BDCM 12, the delta inverter 102 preferably includes diodes 124-128, each connected in anti-parallel across the emitter and collector terminals of a separate one of the IBGTs 112-116 as shown in FIG. 3. These diodes function to provide conductive paths enabling the actual phase currents $I_a$, $I_b$, and $I_c$ produced by the back EMF voltages in the stator windings 20a-20c to flow back and charge the direct current voltage sources 118-122, when BDCM 12 is operating in a free wheeling mode with its permanent magnet rotor 18 is rotating, and the solid state switching devices 112-116 are switched to the off or non-conducting state.

Broadly speaking, closed-loop motor controller 104 operates in a closed-loop fashion by receiving motor operating signals 49 from BDCM 12 along with motor command signal 50 to generate gate signals 130, designated individually as $S_1$-$S_3$, for switching solid switching state devices 112-116 to operate BDCM 12 in accordance with the motor command signal 50. This is accomplished by selecting the form and timing of gate signals $S_1$-$S_3$ so that each of the actual three phase currents $I_a$, $I_b$, and $I_c$ driving BDCM 12 are controlled to approximate the idealized quasi-square waveforms of *$I_a$, *$I_b$, and *$I_c$, where the amplitudes of these idealized quasi-square waveforms are determined based upon the motor command signal 50, and at least one of the motor operating signals 49.

Figure 4:
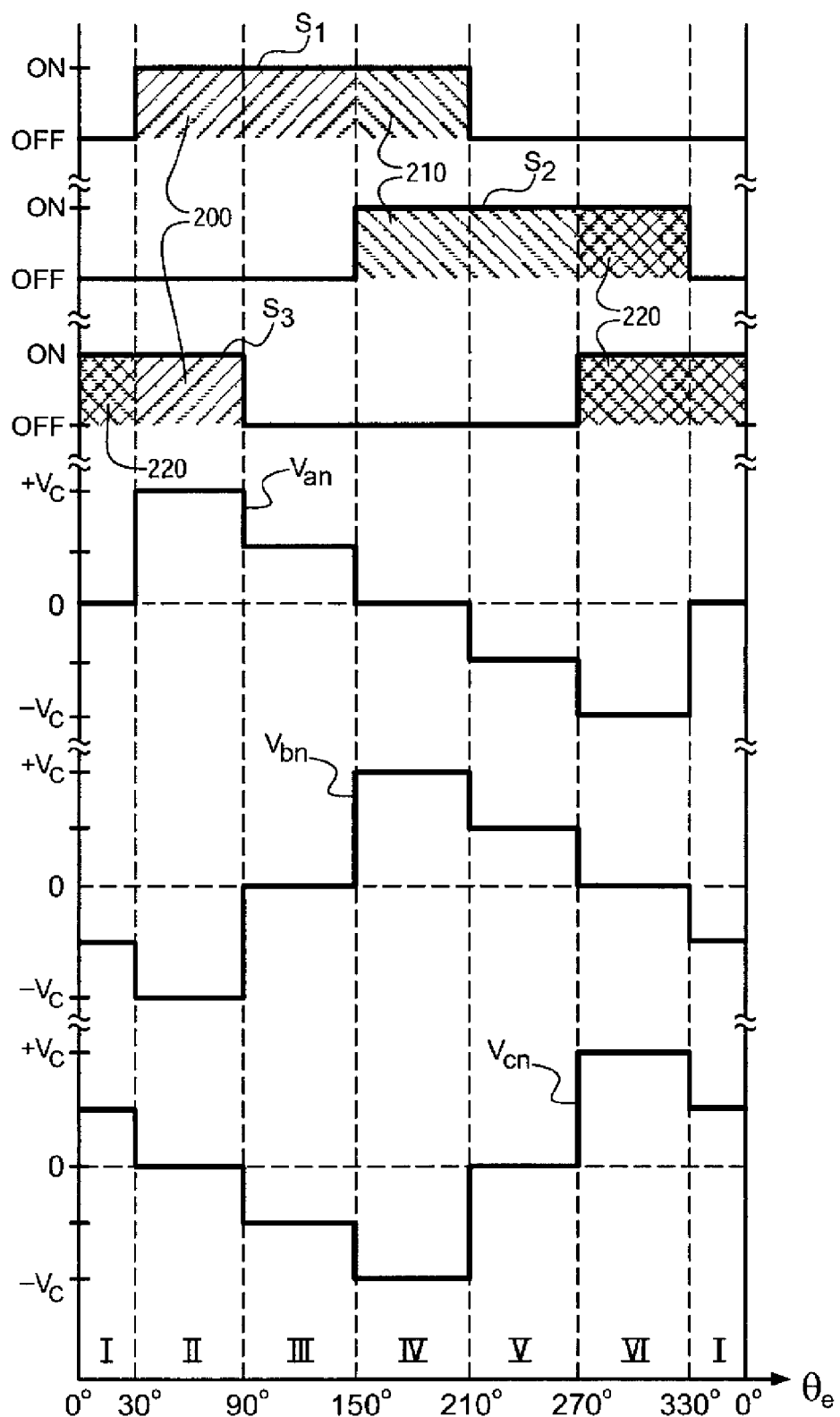
FIG. 4 shows a graphical representation of the gate signals used for switching solid state switching devices in a delta inverter employed to drive a BDCM, and the resulting phase voltages across the stator windings of the BDCM.

The Applicants have found that by selecting the gate signals $S_1$-$S_3$ to have the form and timing illustrated in FIG. 4, each of the solid state switching devices 112-116 can be selectively activated to sequentially apply the terminal voltages $V_c$ of the different direct current voltage sources 118-122 across different pairs of stator windings 20a-20c so the resulting actual phase currents $I_a$, $I_b$, and $I_c$ driving BDCM 12 will have the form of (i.e., approximate) the idealized quasi-square waveforms shown in FIG. 2.

For example, during the commutation sequence I (i.e., $\theta_e$ varies from 330° to 30°), the amplitude of the envelope of gate signal $S_3$ is sufficiently positive to activate solid state switching device 116 to the ON or conducting state, while the amplitude of the envelopes for gate signals $S_1$ and $S_2$ are not sufficient to activate their respective solid state switching devices 112 and 114, which are then in their OFF or non-conducting states. This being the case, the terminal voltage $V_C$ of direct current voltage source 122 is applied across motor terminals C and B, which causes phase current $I_c$ to flow from the positive terminal of direct current voltage source 122 into stator winding 20c, through stator winding 20b, and back to the negative terminal of direct current voltage source 122. Thus, $I_a$=0 and $I_b$=−$I_c$ with $I_c$>0, during commutation sequence I, thereby causing or controlling the actual phase currents to have the shape of the idealized quasi-square waveforms of FIG. 2 during commutation sequence I.

During commutation sequence II, (i.e., $\theta_e$ varies from 30° to 90°), the amplitude of the envelopes of gate signals $S_1$ and $S_3$ are sufficiently positive to active their respective solid state switching devices 112 and 116 to the ON or conducting state, while the amplitude of the envelope of gate signal $S_2$ is not sufficient to activate its respective solid state switching device 114, which is then in its OFF or non-conducting state. This being the case, the terminal voltage $V_C$ of direct current voltage source 118 and the terminal voltage $V_C$ of direct current voltage source 122 are essentially applied in series across motor terminals A and B, which causes phase current $I_a$ to flow from the positive terminal of direct current voltage source 118 into stator windings 20a, through stator winding 20b, and back to the negative terminal of direct current voltage source 122. Thus, $I_b$=−$I_a$ with $I_a$>0 and $I_c$=0 due to the similarity of the electrical impedance of the stator windings 20a-20b, thereby causing or controlling the actual phase currents to have the shape of the idealized quasi-square waveforms of FIG. 2 during this commutation sequence II.

Those skilled in the art will recognize that the above described application of direct current voltage sources 118 and 112 to the stator windings 20a and 20b is equivalent to considering that the terminal voltage $V_C$ of direct current voltage source 118 is applied across the pair of wye-connected stator windings 20a and 20b, and the terminal voltage $V_C$ of direct current voltage source 122 is applied across the pair of wye-connected stator windings 20b and 20c, where the direct current voltage sources 118 and 122 each causes equal but opposite current flow in stator winding 20c such that $I_c$=0, and $V_{cn}$=0.

Likewise for each of the other commutation sequences III, IV, V, and VI in FIG. 4, the envelopes of the shown gate signals $S_1$-$S_3$ will switch the following respective solid state switching devices to the ON or conducting state: (112 for sequence III); (112 and 114 for sequence IV); (114 for sequence V); and (114 and 116 for sequence VI). It will be understood that this switching of delta inverter 102 causes either one or two of the direct current voltage sources 118-122 to be applied across different pairs of the stator windings 20a-20c during different commutation sequences so the actual phase currents $I_a$, $I_b$, and $I_c$ can be controlled to take the form of, or approximate, the idealized quasi-square waveforms of FIG. 2.

FIG. 4 also illustrates the corresponding waveforms for the phase voltages $V_{an}$, $V_{bn}$, and $V_{cn}$ (phase to neutral voltages) energizing the stator windings 20a-20c, when gate signals $S_1$-$S_3$ activate the solid state switching devices 112-116 during the commutation sequences I-VI, as described above. Because these phase voltages $V_{an}$, $V_{bn}$, and $V_{cn}$ vary in stepwise fashion for the different commutation sequences I-VI, the Applicants have found that by appropriately pulse width modulating each gate signals $S_1$-$S_3$, the average voltages of these phase voltages can be controlled to avoid similar undesirable stepwise variations in the actual phase currents and resulting torque developed by BDCM 12.

The different shaded regions 200, 210, and 220 under the envelopes of gate signals $S_1$-$S_3$ represents different pulse width modulation applied to these gate signals when controlling the amplitudes of the actual phase currents $I_a$, $I_b$, and $I_c$ so that BDCM 12 operates in accordance with the motor command signal 50. The Applicants have found in order to appropriately control BDCM 12 to achieve a commanded operating condition, different portions of each gate signal $S_1$-$S_3$ are modulated using pulse width modulation signals having different duty cycles, where the different duty cycles are determined based upon the motor command signal and different ones of the motor operating signals. An exemplary approach for implementing a closed-loop motor controller for modulating different portions of gate signals $S_1$-$S_3$ as discussed above will now be described with reference to FIG. 5.

Figure 5:
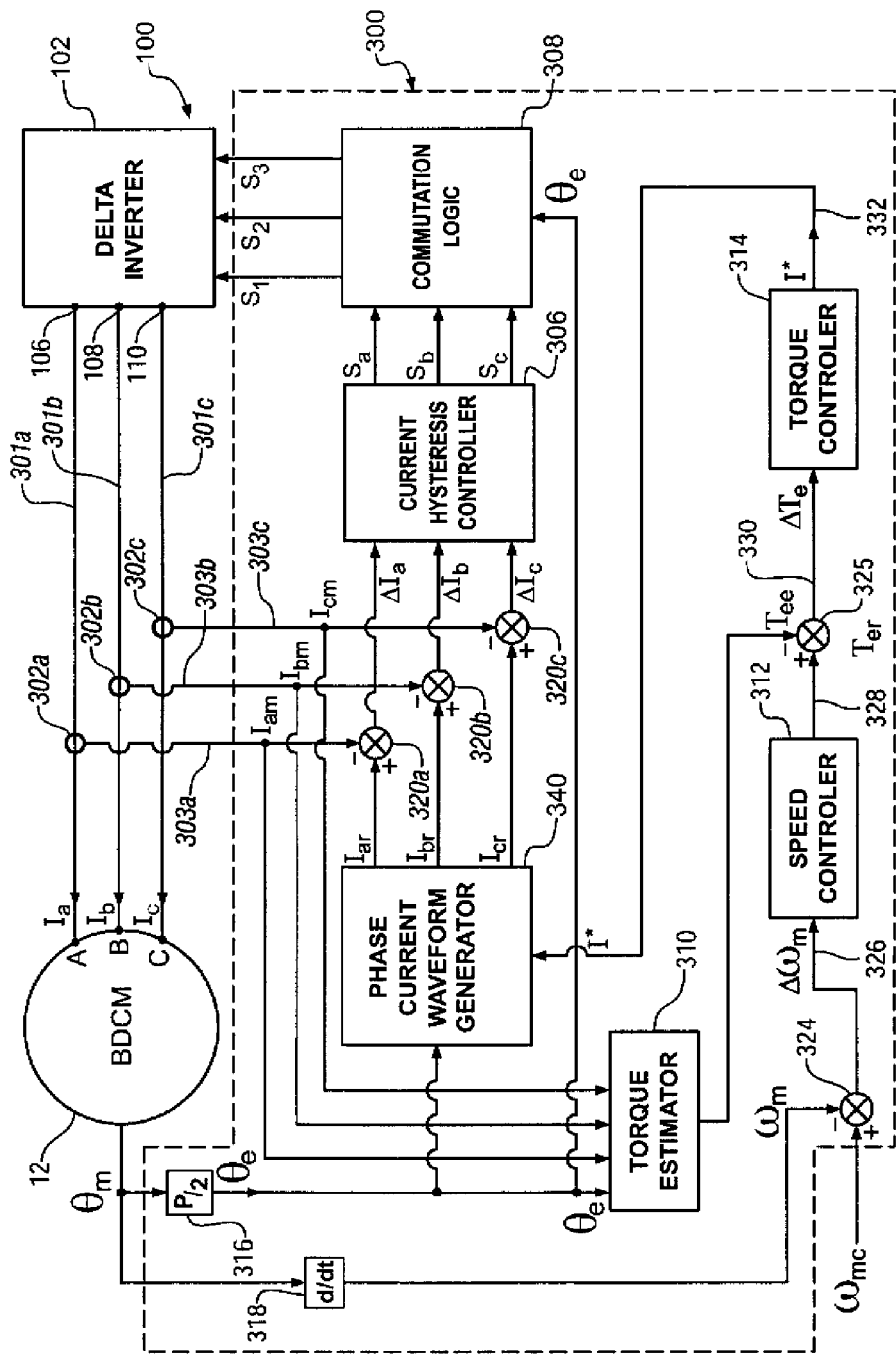
FIG. 5 shows a functional block diagram for an exemplary closed-loop motor controller employed in a BDCM control device that operates in accordance with the principles of the present invention.

FIG. 5 provides a more detailed drawing for the control device 100 previously shown in FIG. 3, which includes an exemplary implementation for closed-loop motor controller 104 shown in functional block diagram form and designated by the numeral 300. In what follows, it will be understood that in referring to closed-loop motor controller 300, reference is being made to the exemplary function block diagram representation of the closed-loop motor controller 104 employed in the control device 100 shown in FIG. 3.

Referring then to FIG. 5, delta inverter 102 is shown coupled to BDCM 12 by conducting lines 301a-301c, which respectively connect motor terminals A-C to inverter terminals 106-110, thereby providing conducting paths for the phase currents $I_a$, $I_b$, and $I_c$ to flow from delta inverter 102 and drive BDCM 12.

Current sensors designated as 302a-302c are coupled respectively to conducting lines 301a-301c for measuring the amplitude of the actual phase currents $I_a$, $I_b$, and $I_c$ being delivered to BDCM 12. Current sensors 302a-302c are well know in the motor control art, and respectively provide measured phase current signals $I_{am}$, $I_{bm}$, and $I_{cm}$ as outputs on lines 303a-303c. These measured phase current signals $I_{am}$, $I_{bm}$, and $I_{cm}$ are indicative of the amplitudes of the actual phase currents $I_a$, $I_b$, and $I_c$ being delivered to BDCM 12. It will be understood that the measured phase current signals $I_{am}$, $I_{bm}$, and $I_{cm}$ can be obtained by using only two of the three shown current sensors 302a-302c to measure only two of these phase currents and then determining the third based upon the known relationship: $I_{am}+I_{bm}+I_{cm}=0$.

In this embodiment, BDCM 12 contains rotor position sensor 22 (not shown) that provides the output motor position signal $\theta_m$ representing the mechanical rotational angular position of rotor 18 relative to the motor stator windings 20a-20c (see FIG. 1 and related description). Accordingly, the output motor position signal $\theta_m$ from BDCM 12, and the measured phase current signals $I_{am}$, $I_{bm}$, and $I_{cm}$ provided by currents sensors 302a-302c then comprise what was referred to as motor operating signals 49 in the discussion associated with FIG. 3.

In this embodiment, the commanded motor speed signal $\omega_{mc}$ represents the desired or commanded mechanical rotational speed for BDCM 12, which corresponds to the motor command signal 50 previously referred to in the discussion related to FIG. 3.

In what follows, closed-loop motor controller 300 generates the appropriate gate signals $S_1$-$S_3$ for switching the delta inverter 102 based upon the commanded motor speed signal $\omega_{mc}$, the motor position signal $\theta_m$, and measured phase current signals $I_{am}$, $I_{bm}$, and $I_{cm}$ being delivered to drive BDCM 12. Closed-loop motor controller 300 receives the motor rotational position signal $\theta_m$ from BDCM 12, which is input to differentiator 318. Differentiator 318 operates to take the time derivative of the $\theta_m$ signal to produce an output motor operating speed signal (or $\omega_m$ signal), which represents the measured mechanical rotational speed of rotor 18 of BDCM 12 (see Equation 5 above). The $\theta_m$ signal is also input to converter 316, which uses the known number of physical poles P of BDCM 12 to compute and output a motor electrical position signal $\theta_e$ representing the electrical rotational angular position of rotor 18 (see Equation 1). This $\theta_e$ signal provides the basic timing for closed-loop motor controller 300, and is directed as an input to torque estimator 310, phase current waveform generator 340, and commutation logic 308.

The phase current waveform generator 340 uses the $\theta_e$ signal to generate values for the idealized phase currents $*I_a$, $*I_b$, and $*I_c$ based upon known shape of the quasi-square waveforms shown in FIG. 2. Phase current waveform generator 340 also receives a current control signal I*. As will be described in detail below, this current control signal I* represents the amplitude required for the quasi-square waveform idealized phase currents $*I_a$, $*I_b$, and $*I_c$ to operate BDCM 12 in accordance with the commanded motor speed signal $\omega_{mc}$.

Using the above input signals, the phase current waveform generator 340 outputs three reference phase current signals $I_{ar}$, $I_{br}$, and $I_{cr}$, where each is computed as follows:

$$I_{ar}=I^*\cdot{}^*I_a, \quad (6)$$

$$I_{br}=I^*\cdot{}^*I_b, \quad (7)$$

$$\text{and } I_{cr}=I^*\cdot{}^*I_c, \quad (8)$$

where each of the idealized quasi-square waveforms for $*I_a$, $*I_a$, and $*I_a$ is assumed to have maximum and minimum normalized amplitudes of +1 and −1 respectively.

The above computed reference phase current signals $I_{ar}$, $I_{br}$, and $I_{cr}$ are respectively directed to the positive inputs of current comparators 320a-320c, and the measured phase current signals $I_{am}$, $I_{bm}$, and $I_{cm}$ are respectively directed to the negative inputs of current comparators 320a-320c. Accordingly, current comparators 320a-320c compute the difference between the corresponding reference and measured phase current signals applied to their inputs, and respectively output the computed differences as phase current error signals denoted as $\Delta I_a$, $\Delta I_b$, and $\Delta I_c$.

The phase current error signals $\Delta I_a$, $\Delta I_b$, and $\Delta I_c$ are each provided as inputs to current hysteresis controller 306, which operates individually on each of these signals to produce corresponding pulse width modulated output signals, each denoted respectively as pulse width modulation signals $S_a$, $S_b$, and $S_c$. Current hysteresis controllers are known in the motor control art, and are used to establish a predetermined hysteresis band about a desired operating waveform (in this case, each of the reference phase current signals $I_{ar}$, $I_{br}$, and $I_{cr}$. Such hysteresis bands are typically defined by upper and lower limits, respectively denoted for example as $U_L$ and $L_L$. In operation, hysteresis controller 306 separately compares each of the current error signals $\Delta I_a$, $\Delta I_b$, and $\Delta I_c$ with the upper and lower limits $U_L$ and $L_L$ to determine the duty cycle for each of the respectively generated output pulse width modulation signals $S_a$, $S_b$, and $S_c$. For example, if the phase current error signal $\Delta I_a = I_{ar} - I_{am} < -U_L$, then the measured phase current $I_{am}$ has exceed the desired or reference phase current $I_{ar}$ by more that the upper limit $U_L$ so the associated pulse width modulation signal $S_a$ is turned off (or set to a logic 0 condition), where it remains until $\Delta I_a = I_{ar} - I_{am} > L_L$, which indicates that the measure phase current $I_{am}$ has fallen below the reference phase current $I_{ar}$ by more that the lower limit $L_L$ so the associated pulse width modulation signal $S_a$ is again turned on (or set to a logic 1 condition). Likewise, this same process is carried out by hysteresis controller 306 in determining the duty cycle for the other pulse width modulation signals $S_b$ and $S_c$ based upon their respective phase current error signals $\Delta I_b$ and $\Delta I_c$. It will be understood that the duty cycle for each of the pulse width modulation signals $S_a$, $S_b$, and $S_c$ is determined based upon a different one of the motor operating signals, in this case different respective ones of measured phase current signals $I_{am}$, $I_{bm}$, and $I_{cm}$.

The pulse width modulation signals $S_a$, $S_b$, and $S_c$ act as input to the commutation logic 308, which also receives the motor electrical position signal $\theta_e$ as previously described. The commutation logic 308 operates on these input signals to generate gate signals $S_1$, $S_2$, and $S_3$ that are applied to switch the solid state switching devices 112-116 as previously discussed with respect to FIG. 3 and FIG. 4.

It will be understood that commutation logic 308 first uses the motor electrical position signal $\theta_e$ to generate signals having the defined envelopes of the gate signals $S_1$, $S_2$, and $S_3$ shown in FIG. 4. Pulse width modulation of the envelopes signals representing gate signals $S_1$, $S_2$, and $S_3$ can then be accomplished by using simple logic operations between one or more of the pulse width modulation signals $S_a$, $S_b$, and $S_c$ during the appropriate motor commutation sequences I-VI.

The Applicants have found that unlike BDCM control devices utilizing full-wave bridge inverters, the gate signals $S_1$, $S_2$, and $S_3$ for the control device of the present invention can not all be modulated using a common pulse width modulation signal. Preferably, each gate signal $S_1$, $S_2$, and $S_3$ has portions (defined by commutation sequences), which are selectively modulated using at least two of the different pulse width modulation signals $S_a$, $S_b$, and $S_c$ as described below.

During commutation sequences II and III (see FIG. 2 and FIG. 5), it will be recognized that the reference phase current signals $I_{ar}$, $I_{br}$, and $I_{cr}$ will be generated to have the shape of the idealized quasi-square waveforms of $*I_a$, $*I_b$, and $*I_c$. Accordingly, $I_{ar}$ will have a positive amplitude equal to the value of the current control signal I*, as previously described. However, during commutation sequence IV, $I_{ar}$ will have a zero value, with $I_{br}$ and $I_{cr}$ now having amplitudes of $I_{br} = -I_{cr} = I^*$. The measured phase current signal $I_{am}$ will similarly also have a small amplitude as its corresponding phase current $I_a$ is being controlled to approach a zero value during sequence IV. As a result, the phase current error signals $\Delta I_a = I_{ar} - I_{am}$ used to determine the duty cycle of the pulse width modulation signal $S_a$ is computed as the difference between two essentially zero amplitude values, which can lead to errors in generating pulse width modulation signal $S_a$ during this commutation sequence IV. As a consequence, the Applicants have found that the gate signal $S_1$ can be effectively modulated by pulse width modulation signal $S_a$ during commutation sequences II and III, but during sequence IV either pulse width modulation signal $S_b$ or pulse width modulation signal $S_c$ should be used to modulate gate signal $S_1$. Likewise, pulse width modulation signal $S_b$ can be used to effectively modulate gate signal $S_2$ during commutation sequences IV and V, but during sequence VI either pulse width modulation signal $S_a$ or pulse width modulation signal $S_c$ should be used to modulate gate signal $S_2$. Pulse width modulation signal $S_c$ can be used to effectively modulate gate signal $S_3$ during commutation sequences VI and I, but during sequence II either pulse width modulation signal $S_a$ or pulse width modulation signal $S_b$ should be used to modulate gate signal $S_3$.

The shaded areas 200-220 in FIG. 4 then illustrate the portions of each of the gate signal $S_1$-$S_3$ that have been modulated using two different ones of the pulse width modulation signals $S_a$, $S_b$, and $S_c$. The shaded region 200 represents the use of pulse width modulation signal $S_a$ in modulating gate signal $S_1$ during commutation sequences II and III, and for example, gate signal $S_3$ during commutation sequence II. Likewise, shade region 210 represents the use of pulse width modulation signal $S_b$ in pulse width modulating gate signal $S_2$ during commutation sequence IV and V, and for example, gate signal $S_1$ during commutation sequences IV. Similarly, shade region 220 represents the use of pulse width modulation signal $S_c$ in pulse width modulating and gate signal $S_3$ during commutation sequence I and VI, and for example, gate signal $S_2$ during commutation sequences VI.

Referring again to FIG. 5, the remainder of the functional block diagram for the closed-loop motor controller 300 will now be described with respect to the generation of the current control signal I*. As discussed previously, the current control signal I* represents the amplitudes of the reference phase current signals $I_{ar}$, $I_{br}$, and $I_{cr}$ that are output by waveform generator 340, and used to control BDCM 12 to operate in accordance with the commanded motor speed signal $\omega_{mc}$.

As indicated previously, differentiator 318 outputs motor operating speed signal ($\omega_m$ signal) representing the measured mechanical rotational speed of rotor 18 of BDCM 12. This $\omega_m$ signal is applied to the negative input of speed comparator 324, along with the commanded motor speed signal $\omega_{mc}$, which is applied to the positive input. Speed comparator 324 then computes a motor speed error signal $\Delta\omega_m$, which is the difference between the commanded motor speed signal and the motor operating speed signal. This motor speed error signal $\Delta\omega_m$ is output on conducting line 326 to act as an input signal for speed controller 312.

Speed controller 312 operates on the motor speed error signal $\Delta\omega_m$ to output a reference torque signal $T_{er}$ on conducting line 328. This reference torque signal $T_{er}$ represents the electromagnetic torque $T_e$ required to be generated by BDCM 12 in order to reduce the motor speed error signal $\Delta\omega_m$ to zero so that BDCM 12 operates at the commanded motor speed $\omega_{mc}$. The electromagnetic torque $T_e$ is given by the known expression:

$$T_e = (I_a \cdot E_a + I_b \cdot E_b + I_c \cdot E_c)/\omega_m, \qquad (9)$$

where $\omega_m$ represents the mechanical rotational speed of rotor 18; $I_a$, $I_b$, and $I_c$ are the actual phase currents flowing respectively in stator windings 20a-20c; and $E_a$, $E_b$ and $E_c$ are the respective back EMF voltages generated in stator windings 20a-20c.

As shown, the reference torque signal $T_{er}$ is output from speed controller 312 on conducting line 328 to the positive input of torque comparator 325. The negative input of torque comparator 325 receives an estimated torque signal $T_{ee}$, which is calculated and output by torque estimator 310, as will be subsequently be explained. This estimated motor torque signal $T_{ee}$ represents a calculated estimate of the actual electromagnetic torque Te being produced by BCDM 12. Torque comparator 325 computes an motor torque error signal $\Delta T_e = T_{er} - T_{ee}$, which is output on conducting line 330 to act as an input signal for torque controller 314.

The Applicants have found a particularly useful way for implementing the torque estimator 310, which generates the estimated motor torque signal $T_{ee}$. Referring to equation (9), it will be understood that representative values for the actual phase currents $I_a$, $I_b$, and $I_c$ are provided to torque estimator 310 by inputting the measured phase current signals $I_{am}$, $I_{bm}$, and $I_{cm}$ provided by current sensors 302a-302c. Assuming that BDCM 12 is being controlled to essentially operate with the idealized trapezoidal back EMF phase voltages represented by Equations (2)-(4), it can be shown that an estimate for the electromagnetic torque generated by BDCM 12 is given by:

$$T_{ee} = K_t \cdot (f_a(\theta_e) \cdot I_{am} + f_b(\theta_e) \cdot I_{bm} + f_c(\theta_e) \cdot I_{cm}), \tag{10}$$

where the functions $f_a(\theta_e)$, $f_a(\theta_e)$, and $f_a(\theta_e)$ are the idealized trapezoidal waveforms for the back EMF voltages shown in FIG. 2, which can be determined based upon the motor electrical position signal $\theta_e$, and $K_t$ is a predetermined torque constant for BDCM 12.

Torque controller 314 operates on the motor torque error signal $\Delta T_e$ to output the current control signal I* required to reduce the motor torque error signal $\Delta T_e$ to zero, when controlling BDCM 12 to operate at the commanded motor speed $\omega_{mc}$.

Speed controller 312 and torque controller 314 can be implemented, for example, as known types of proportional-integral-differential (PID) controllers, or variations thereof, such as PI or PD controllers, depending upon the selection of the particular controller operating parameters as required for the particular application.

The Applicants have found that in switching delta inverter 102 to connect its different direct current voltage sources across different pairs of stator windings 20a-20c, significant stepwise variations in the phase voltages $V_{an}$, $V_{bn}$, and $V_{cn}$ occur as shown in FIG. 4. This causes a significant ripple in the torque generated by BDCM 12, which is normally undesirable due to the generation of unwanted motor vibrations, and the resulting non-smooth operation of BDCM 12 in achieving the commanded motor speed signal $\omega_{mc}$. By addition of the torque control loop comprising torque estimator 310, torque comparator 325, and torque controller 314, the Applicants have found that this torque ripple is significantly reduced. Thus, it is preferable to implement the previously described torque loop in closed-loop motor controller 300 in those applications where torque ripple is of concern.

In applications where torque ripple is not of great concern, it will be understood that a more basic embodiment for closed-loop controller 300 can be achieved without the use of the torque loop. In this case, the output conducting line 328 from speed controller 312 can be connected directly to conducting line 332. Speed controller 312 can then be adjusted to directly provide the current control signal I* based upon the motor speed error signal $\Delta \omega_m$, without the torque loop components, i.e., the torque estimator 310, the torque controller 314, and the torque comparator 325.

In those applications where it is desirable to control BDCM 12 using a commanded motor torque signal, rather than the commanded motor speed signal (the $\omega_{mc}$ signal), it will be understood that such an embodiment of closed-loop controller 300 would have its commanded motor torque signal input directly to torque comparator 325 as the $T_{er}$ signal for comparison with the estimated torque signal $T_{ee}$. The parameters of torque controller 314 would then be adjusted accordingly to produce the current control signal I* for controlling BDCM 12 to achieve the desired motor operating torque represented by the commanded motor torque signal. Thus, the implementation of this embodiment of the closed-loop controller 300 would not require the differentiator 318, the speed comparator 324, or the speed controller 312.

The Applicants have also found that in certain applications, it can be advantageous to select the open-circuit terminal voltage $V_c$ for each of the direct current voltages sources 118-122 in the delta inverter 102 to be in the range of 20 to 60 volts. When the invention is used in hybrid vehicle applications, this particular range of voltages for $V_c$, in combination with the structure of the delta inverter 102, will prevent exposure to high voltages when the vehicle is shut off without requiring the use of conventional contactors (heavy-duty electromechanical switches). In addition, the combined voltages of the three direct current voltage sources 118-122 will also then meet the California definition of a hybrid vehicle having a total battery voltage of 60 volts or more.

While the invention has been described by reference to certain preferred embodiments and implementations, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. A control device for driving a brushless direct current motor, the motor having a permanent magnet rotor and three stator windings, where each stator winding is energized by timed application of a phase voltage to produce first, second and third phase currents each flowing in a respective one of the stator windings, thereby establishing a rotating magnetic field causing rotation of the rotor, the control device comprising:
   an inverter having first, second, and third direct current voltage sources and first, second, and third solid state switching devices, whereby the first, second, and third direct current voltage sources are selectively coupled across different pairs of the stator windings by application of first, second, and third gate signals to switch the respective first, second, and third solid state switching devices to conducting states, thereby providing the phase voltage to energize each stator winding by timed application of the gate signals to the solid state switching devices; and
   a closed-loop motor controller receiving a motor command signal indicative of a desired operating condition for the motor and a plurality of motor operating signals indicative of measured motor operating characteristics, the closed-loop motor controller being adapted to generate the first, second, and third gate signals based upon the motor command signal and the motor operating signals to control the phase currents for operation of the motor at the desired operating condition.

2. The control device of claim 1, the inverter further including first, second, and third diodes, each diode being connected in anti-parallel with a different one of the solid state switching devices to enable phase currents from the stator windings of the motor to charge the direct current voltages sources of the inverter when the solid state switching devices are switched to non-conducting states by the gate signals.

3. The control device of claim 1, wherein different portions of each of the first, second, and third gate signals are modulated by different pulse width modulation signals having different duty cycles, where the different duty cycles are each determined based upon the motor command signal and different ones of the motor operating signals.

4. The control device of claim 1, wherein the closed-loop motor controller includes a phase current waveform generator, the phase current waveform generator producing first, second, and third reference phase current signals based upon the motor command signal and the motor operating signals, the first, second, and third reference phase current signals each having different quasi-square waveforms respectively corresponding to desired forms for the first, second, and third phase currents to control the motor to achieve the desired motor operating condition.

5. The control device of claim 4, wherein:
the motor operating signals include a rotor position signal provided by a rotor position sensor, the rotor position signal representing a mechanical rotational position of the rotor relative to the stator windings, the rotor position signal being used by the closed-loop motor controller to compute a motor electrical position signal representing an electrical rotational position of the rotor during electrical cycles of rotation, each electrical cycle of rotation being divided into a plurality of commutation sequences; and
each different quasi-square waveform includes a positive amplitude square shaped pulse and a negative amplitude square shaped pulse occurring during each electrical cycle of rotation as determined by the motor electrical position signal.

6. The control device of claim 5, wherein:
the motor operating signals further include first, second, and third measured phase current signals obtained from a plurality of current sensors coupled to the stator windings of the motor, the first, second, and third measured phase current signals respectively representing the first, second, and third phase currents flowing in the stator windings; and
the closed-loop motor controller further including first, second, and third current comparators for determining first, second, and third phase current error signals each computed as a difference between respective ones of the first, second, and third reference phase current signals and the first, second and third measured current signals.

7. The control device of claim 6, wherein the closed-loop motor controller further includes a current hysteresis controller for receiving the first, second, and third phase current error signals and generating first, second, and third pulse width modulation signals each having a pulse width determined by a respective one of the first, second, and third phase current error signals.

8. The control device of claim 7, wherein the closed-loop motor controller further includes commutation logic for generating the first, second, and third gate signals for timed application to the solid state switching devices of the inverter, each gate signal being timed to occur during respectively defined consecutive commutation sequences in accordance with the motor electrical position signal, and each gate signal being modulated by one of the first, second, and third pulse width modulation signals during each respectively defined consecutive commutation sequences, where at least two different pulse width modulation signals are used to modulate each gate signal.

9. The control device of claim 6, wherein:
the motor command signal comprises a commanded motor speed signal indicative of a desired motor operating speed; and
closed-loop motor controller further includes a differentiator for operating on the rotor position signal to produce a motor operating speed signal indicative of the actual mechanical rotational speed of the rotor, and a speed comparator for computing a motor speed error signal as a difference between the commanded motor speed signal and the motor operating speed signal.

10. The control device of claim 9, wherein the reference phase current signals generated by the phase current waveform generator have amplitudes adjusted in accordance with the motor speed error signal.

11. The control device of claim 9, wherein closed-loop motor controller further includes:
a speed controller for operating on the motor speed error signal to produce a torque reference signal indicative of electromagnetic torque required to be produced by the motor in order to reduce the motor speed error signal to a zero value for operation of the motor at the desired motor operating speed;
a torque estimator for generating an estimated motor torque signal indicative of actual electromagnetic torque being produced by the motor, the estimated motor torque signal being determined based upon the motor operating signals; and
a torque comparator for computing a motor torque error signal as a difference between the torque reference signal and the estimated motor torque signal, where the referenced phase current signals generated by the phase current waveform generator have amplitudes determined in accordance with the motor torque error signal, thereby reducing motor torque ripple.

12. The control device of claim 11, wherein:
the motor operating signals further include first, second, and third measured phase current signals provided by a plurality of current sensors coupled to the stator windings of the motor, the first, second, and third measured phase current signals respectively representing the first, second, and third phase currents flowing in the stator windings;
the torque estimator generates first, second, and third trapezoidal waveforms based upon the rotor position signal, where the first, second, and third trapezoidal waveforms represent back EMF voltages produced in the stator windings when the respective first, second, and third phase currents are controlled to approximate the quasi-square waveforms corresponding respectively to the first, second, and third reference phase current signals; and
the torque estimator generates the estimated motor torque signal by summing first, second, and third products, where the first produce is computed by multiplying the first trapezoidal waveform by the first measured phase current signal, the second product is computed by multiplying the second trapezoidal waveform by the second measured phase current signal, and the third product is computed by multiplying the third trapezoidal waveform by the third measured phase current signal.

13. The control device of claim 5, wherein:
the motor command signal is a commanded motor torque signal indicative of a desired motor operating torque; and
the closed-loop motor controller further includes a torque estimator for generating an estimated motor torque signal indicative of actual electromagnetic torque being produced by the motor, the estimated motor torque signal being determined based upon the motor operating signals;

and a torque comparator for computing a motor torque error signal as a difference between the commanded motor torque signal and the estimated motor torque signal, where the referenced phase current signals generated by the phase current waveform generator have amplitudes determined in accordance with the motor torque error signal, thereby reducing motor torque ripple.

14. The control device of claim 13, wherein:

the motor operating signals further include first, second, and third measured phase current signals provided by a plurality of current sensors coupled to the stator windings of the motor, the first, second, and third measured phase current signals respectively representing the first, second, and third phase currents flowing in the stator windings;

the torque estimator generates first, second, and third trapezoidal waveforms based upon the rotor position signal, where the first, second, and third trapezoidal waveforms represent back EMF voltages produced in the stator windings when the respective first, second, and third phase currents are controlled to approximate the quasi-square waveforms corresponding respectively to the first, second, and third reference phase current signals; and the torque estimator generates the estimated motor torque signal by summing first, second, and third products, where the first product is computed by multiplying the first trapezoidal waveform by the first measured phase current signal, the second product is computed by multiplying the second trapezoidal waveform by the second measured phase current signal, and the third product is computed by multiplying the third trapezoidal waveform by the third measured phase current signal.

15. The control device of claim 1, wherein the first, second, and third direct current voltage sources have substantially equal open-circuit terminal voltages which are in a range from 20 to 60 volts.

16. Control device for driving a brushless direct current motor, the motor having a permanent magnet rotor and three stator windings, where each stator winding is energized by timed application of a phase voltages to produce first, second and third phase currents each flowing in a respective one of the stator windings, thereby establishing a rotating magnetic field causing rotation of the rotor, the control device comprising:

an inverter having first, second, and third inverter terminals, each of the inverter terminals being coupled to a different one of the phase winding of the motor, the inverter having first, second, and third solid state switching devices and first, second, and third direct current voltage sources, wherein the first solid state switching device and the first direct current voltage source are connected in series between the first and second inverter terminals to conduct current in a direction toward the first inverter terminal when the first solid state switching device is switched to a conducting state by a first gate signal, the second solid state switching device and the second direct current voltage source being connected in series between the first and third inverter terminals to conduct current in a direction toward the third inverter terminal when the second solid state switching device is switched to a conducting state by a second gate signal, and the third solid state switching device and the third direct current voltage source being connected in series between the second and third inverter terminals to conduct current in a direction toward the second inverter terminal when the third solid state switching device is switched to a conducting state by a third gate signal; wherein the first, second, and third direct current voltage sources are applied to provided the phase voltage energizing each of the stator windings of the motor by timed application of the first, second, and third gate signals to the first, second, and third solid state switching devices; and a closed-loop motor controller receiving a motor command signal indicative of a desired operating condition for the motor and a plurality of motor operating signals indicative of measured motor operating characteristics, the closed-loop motor controller being adapted to generate the first, second, and third gate signals based upon the motor command signal and the motor operating signals to control the phase currents produced in the stator windings for operation of the motor at the desired operating condition.

17. A method for controlling a brushless direct current motor, the motor having a permanent magnet rotor and three stator windings, where the stator windings are energized by application of phase voltages to produce phase currents flowing in the stator windings, thereby establishing a rotating magnetic field causing rotation of the rotor, the steps of the method comprising:

receiving a motor command signal indicative of a desired operating condition for the motor and a plurality of motor operating signals indicative of measured motor operating characteristics;

generating a first, second, and third gate signals based upon the motor command signal and the motor operating signals; and applying the first, second, and third gate signals to respective first, second, and third solid state switching devices to selectively switch the first, second, and third solid state switching devices to conductive states, where first, second, and third direct current voltage sources are each connected in series with respective ones of the first, second, and third solid state switching devices and respective different pairs of the stator windings, whereby the different pairs of stator windings are energized by timed application of the first, second, and third gate signals to control of the phase currents produced in the stator windings for motor operation at a desired operating condition.

18. The method of claim 17, further including the step of modulating different portions of each of the first, second, and third gate signals with different pulse width modulation signals, each pulse width modulation signal having a different duty cycle determined based upon the motor command signal and different ones of the motor operating signals.

19. The method of claim 18, wherein the motor operating signals comprises motor electrical position signal, and first, second, and third measured phase current signals indicative of the phase currents flowing in each of the stator windings.

20. The method of claim 19, further including the steps of:

generating first, second, and third reference phase current signals based upon the motor operating signals and the motor command signal;

comparing the first, second, and third reference phase current signals with respective first, second, and third measured phase current signals to obtain respective first, second, and third phase current error signals; and determining the different duty cycles of the different pulse width modulation signals based upon different ones of the first, second, and third phase current error signals.

* * * * *